(12) United States Patent
Watanabe et al.

(10) Patent No.: US 10,593,321 B2
(45) Date of Patent: Mar. 17, 2020

(54) METHOD AND APPARATUS FOR MULTI-LINGUAL END-TO-END SPEECH RECOGNITION

(71) Applicant: Mitsubishi Electric Research Laboratories, Inc., Cambridge, MA (US)

(72) Inventors: Shinji Watanabe, Baltimore, MD (US); Takaaki Hori, Lexington, MA (US); Hiroshi Seki, Toyohashi (JP); Jonathan Le Roux, Arlington, MA (US); John Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 8 days.

(21) Appl. No.: 15/843,047

(22) Filed: Dec. 15, 2017

(65) Prior Publication Data

US 2019/0189111 A1   Jun. 20, 2019

(51) Int. Cl.
*G10L 15/06* (2013.01)
*G06N 3/08* (2006.01)
(Continued)

(52) U.S. Cl.
CPC .......... *G10L 15/063* (2013.01); *G06N 3/0445* (2013.01); *G06N 3/0454* (2013.01); *G06N 3/08* (2013.01); *G06N 7/005* (2013.01); *G10L 15/02* (2013.01); *G10L 15/16* (2013.01); *G10L 15/197* (2013.01); *G10L 15/22* (2013.01); *G10L 15/005* (2013.01)

(58) Field of Classification Search
CPC combination set(s) only.
See application file for complete search history.

(56) References Cited

U.S. PATENT DOCUMENTS 9,799,327 B1 * 10/2017 Chan ...................... G10L 15/16
2006/0206331 A1 * 9/2006 Hennecke ............ G10L 15/187
704/254
(Continued)

OTHER PUBLICATIONS

Watanabe et al., "Language Independent End-To-End Architecture for Joint Language Identification and Speech Recognition." Automatic Speech Recognition and Understanding Workshop (ASRU), 2017 IEEE. Dec. 16-20, 2017, Okinawa, Japan.
(Continued)

*Primary Examiner* — Abul K Azad
(74) *Attorney, Agent, or Firm* — Gennadiy Vinokur; James McAleenan; Hironori Tsukamoto

(57) ABSTRACT

A method for training a multi-language speech recognition network includes providing utterance datasets corresponding to predetermined languages, inserting language identification (ID) labels into the utterance datasets, wherein each of the utterance datasets is labelled by each of the language ID labels, concatenating the labeled utterance datasets, generating initial network parameters from the utterance datasets, selecting the initial network parameters according to a predetermined sequence, and training, iteratively, an end-to-end network with a series of the selected initial network parameters and the concatenated labeled utterance datasets until a training result reaches a threshold.

18 Claims, 8 Drawing Sheets

(51) Int. Cl.
*G06N 7/00* (2006.01)
*G06N 3/04* (2006.01)
*G10L 15/02* (2006.01)
*G10L 15/16* (2006.01)
*G10L 15/197* (2013.01)
*G10L 15/22* (2006.01)
*G10L 15/00* (2013.01)

(56) References Cited

U.S. PATENT DOCUMENTS

| | | | |
|---|---|---|---|
| 2006/0229864 A1* | 10/2006 | Suontausta | G06F 17/2217 704/8 |
| 2018/0018973 A1* | 1/2018 | Moreno | G10L 17/22 |
| 2019/0073524 A1* | 3/2019 | Yi | G06K 9/00348 |

OTHER PUBLICATIONS

Seki et al., "An End-To-End Language-Tracking Speech Recognizer for Mixed-Language Speech." IEEE ICASSP 2018., SP-L6: Multi-lingual Speech Recognition, Session Type: Lecture, Time: Wednesday, Apr. 18, 16:00-18:00.

Watanabe et al., "Hybrid CTC Attention Architecture for End to End Speech Recognition," IEEE Journal of Selected Topics in Signal Processing., vol. 11, No. 8, Oct. 16, 2017. pp. 1240-1253.

Kim et al., "Towards Language Universal End to End Speech Recognition," Arxiv.org, Cornell University Library, 201 Olin Library Cornell University Ithaca, NY. 14853. Nov. 6, 2017.

Bengio et al., "Curriculum Learning," Proceedings of the 26th Annual International Conference on Machine Learning, 2009, ACM Press, NY, NY, US. Jun. 14, 2009. pp. 41-48.

* cited by examiner

Algorithm 1 Generation of language switching corpus $N_{concat} \Leftarrow$ maximum number of utterances to concatenate.
$N \Leftarrow$ number of languages.
$D \Leftarrow$ duration of the union of the original corpora.
$n_{reuse} \Leftarrow$ maximum number of times same utterance can be used.
for $i \leftarrow 1$ to $N$ do
  $P(lang_i) = \frac{1}{2} \frac{\text{duration of } lang_i}{\sum_j \text{duration of } lang_j} + \frac{1}{2N}$
  $P(utter_{lang_i, k}) = \frac{1}{\text{number of utterances in } lang_i}$
end for
while duration(*generated corpus*) $\leq D$ do
  for $n_{concat} \leftarrow 1$ to $N_{concat}$ do
    for $i \leftarrow 1$ to $n_{concat}$ do
      Sample language $lang_i$ and utterance $utter_{lang_i, k}$, resampling if $utter_{lang_i, k}$ already selected $n_{reuse}$ times.
    end for
    Concatenate $n_{concat}$ utterances.
    Add to *generated corpus*.
  end for
end while

FIG. 6

| Model | Training with language switching data | Number of languages | | |
|---|---|---|---|---|
| | | 1 | 2 | 3 |
| Language dependent | no | 28.0 | | |
| Language independent (flat start) | no | 19.7 | 31.5 | 38.6 |
| Language independent (flat start) | yes | 21.8 | 21.3 | 20.8 |
| Language independent (retrained) | yes | 19.4 | 19.3 | 18.6 |

FIG. 7

Model w/o language switching
[IT] POINT ON ANDE SCHEDO A FANOTO CHE MA CHE GIRA VA INACATTANDIR CHEDO WE'RE SEEING A RESPONSE THEIR IGHT DIRECTION BUT IT'S CLEARLY TEMPORARED BY NATURAL CONSERVATIVES IN WIGHT NOH WHD OON ZEIDATONIER D AN VOLGEN ZOCIS

Model w/ language switching
[JP] ポイントなんですけど その時はま ー こちらはいなかった と [EN] WE'RE SEEING A RESPONSE IN THE RIGHT DIRECTION BUT IT'S CLEARLY TEMPO RARED BY NATURAL CONSERVATIVES IN RIGHT NOW [NL] DOON ZIJ DAT NIET DAN VOLGENDE ZA MPZIS

Reference
[JP] ポイントなんですけど その時はま ー クジラはいなかった と [EN] WE'RE SEEING A RESPONSE IN THE RIGHT DIRECTION BUT IT'S CLEARLY TEMPERED BY NATURAL CONSERVATISM RIGHT NOW [NL] DOEN ZIJ DAT NIET DAN VOLGEN SANCTIES

FIG. 8

METHOD AND APPARATUS FOR MULTI-LINGUAL END-TO-END SPEECH RECOGNITION

FIELD OF THE INVENTION

This invention generally relates to an apparatus and a method for multi-lingual end-to-end speech recognition, and more specifically to a method and system for training a neural network for joint language identification and speech recognition.

BACKGROUND OF THE INVENTION

End-to-end automatic speech recognition (ASR) has recently proven its effectiveness by reaching the state-of-the-art performance obtained by conventional hybrid ASR systems while surpassing them in terms of ease of development. Conventional ASR systems require language-dependent resources such as pronunciation dictionaries and word segmentation, which are incorporated into models with phonemes as an intermediate representation. These resources are developed by hand and so they carry two disadvantages: first, they may be error-prone or otherwise sub-optimal, and second, they greatly increase the effort required to develop ASR systems, especially for new languages. The use of language-dependent resources thus particularly complicates the development of multi-lingual recognition systems. End-to-end ASR systems, in contrast, directly convert input speech feature sequences to output label sequences (mainly sequences of characters or tokens composed of n-gram characters in embodiments of the present invention) without any explicit intermediate representation of phonetic/linguistic constructs such as phonemes or words. Their main advantage is that they avoid the need for hand-made language-dependent resources.

There have been several prior studies on multilingual/language-independent ASR. In the context of deep neural network (DNN)-based multilingual system, the DNN is used to compute language independent bottleneck features. Therefore, it is necessary to prepare language dependent backend system like pronunciation dictionaries and language models. In addition, it is necessary to predict uttered language to cascade language independent and language dependent modules.

SUMMARY OF THE INVENTION

In this invention, a system and method with a language-independent neural network architecture that can recognize speech and identify language jointly in multiple different languages is disclosed. For example, this invention enables us to automatically recognize utterances in English, Japanese, Mandarin, German, Spanish, French, Italian, Dutch, Portuguese, and Russian, and jointly identify the language of each utterance.

According to an embodiment of the present invention, the network shares all parameters including the softmax layer across languages.

For instance, as the network shares all parameters including softmax layer by concatenating grapheme set of multiple languages, a language-independent neural network architecture of the invention can recognize speech and identify language jointly in different languages, such as English, Japanese, Mandarin, German, Spanish, French, Italian, Dutch, Portuguese, Russian, etc.

The language-independent neural network of the invention enables multi-lingual end-to-end speech recognition by (1) making a universal label set as a union of grapheme sets and language IDs from multiple languages, based on which an initial network is constructed, (2) inserting a language ID label into the transcript of each utterance in multiple different language corpora, (3) generating utterances by selecting one or more utterances from the multiple different language corpora and concatenating them in any order, where the corresponding transcripts are also concatenated in the same order, (4) training the initial network with the generated utterances and the transcripts, and (5) recognizing speech with the trained network.

This monolithic end-to-end ASR system for multi-lingual speech recognition has 3 advantages: first, monolithic architecture removes language-dependent ASR modules and an external language identification module, second, end-to-end architecture makes it unnecessary to prepare a hand-crafted pronunciation dictionary, and third, shared network enables the learning of better feature representation even for a low-resource language.

This invention also makes it possible that the end-to-end ASR system works correctly even if there are switches of language within speech signal, since the training data are augmented to include language switches.

According to some embodiments of the present invention, a method for training a multi-language speech recognition network includes providing utterance datasets corresponding to predetermined languages; inserting language identification (ID) labels into the utterance datasets, wherein each of the utterance datasets is labelled by each of the language ID labels; concatenating the labeled utterance datasets; generating initial network parameters from the utterance datasets; and training, iteratively, an end-to-end network with a series of the initial network parameters and the concatenated labeled utterance datasets until a training result reaches a threshold.

Further, according to an embodiment of the present invention, a speech recognition system for performing multi-language speech recognition includes an interface to receive voice sounds; one or more processors; and one or more storage devices storing an end-to-end speech recognition network module having been trained by using trained network parameters obtained by the method for training a multi-language speech recognition network, wherein the end-to-end speech network recognition module includes instructions which, when executed, cause the one or more processors to perform operations that comprise extracting, using an acoustic feature extraction module, an acoustic feature sequence from audio waveform data converted from the voice sounds; encoding the acoustic feature sequence into a hidden vector sequence using an encoder network having encoder network parameters; predicting first output label sequence probabilities by feeding the hidden vector sequence to a decoder network having decoder network parameters; predicting second output label sequence probabilities by a connectionist temporal classification (CTC) module using CTC network parameters and the hidden vector sequence from the encoder network; and searching, using a label sequence search module, for an output label sequence having a highest sequence probability by combining the first and second output label sequence probabilities provided from the decoder network and the CTC module.

Yet further, according to an embodiment of the present invention, a multi-lingual speech recognition system for generating trained network parameters for a multi-language speech recognition includes one or more processors; and one or more storage devices storing parameters and program modules including instructions executable by the one or more processors which, when executed, cause the one or more processors to perform operations including providing utterance datasets corresponding to predetermined languages; inserting language identification (ID) labels into the utterance datasets, wherein each of the utterance datasets is labelled by each of the language ID labels; concatenating the labeled utterance datasets; generating initial network parameters from the utterance datasets; selecting the initial network parameters according to a predetermined sequence; and training, iteratively, an end-to-end network with a series of the selected initial network parameters and the concatenated labeled utterance datasets until a training result reaches a threshold.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 6 is a data preparation procedure to train a multi-lingual speech recognition module, according to embodiments of the present invention;

FIG. 7 is an evaluation result indicating character error rates as a function of the number of languages in an utterance, according to a multi-lingual speech recognition, according to embodiments of the present invention; and FIG. 8 shows an example output of multi-lingual speech recognition, according to embodiments of the present invention.

Figure 1:
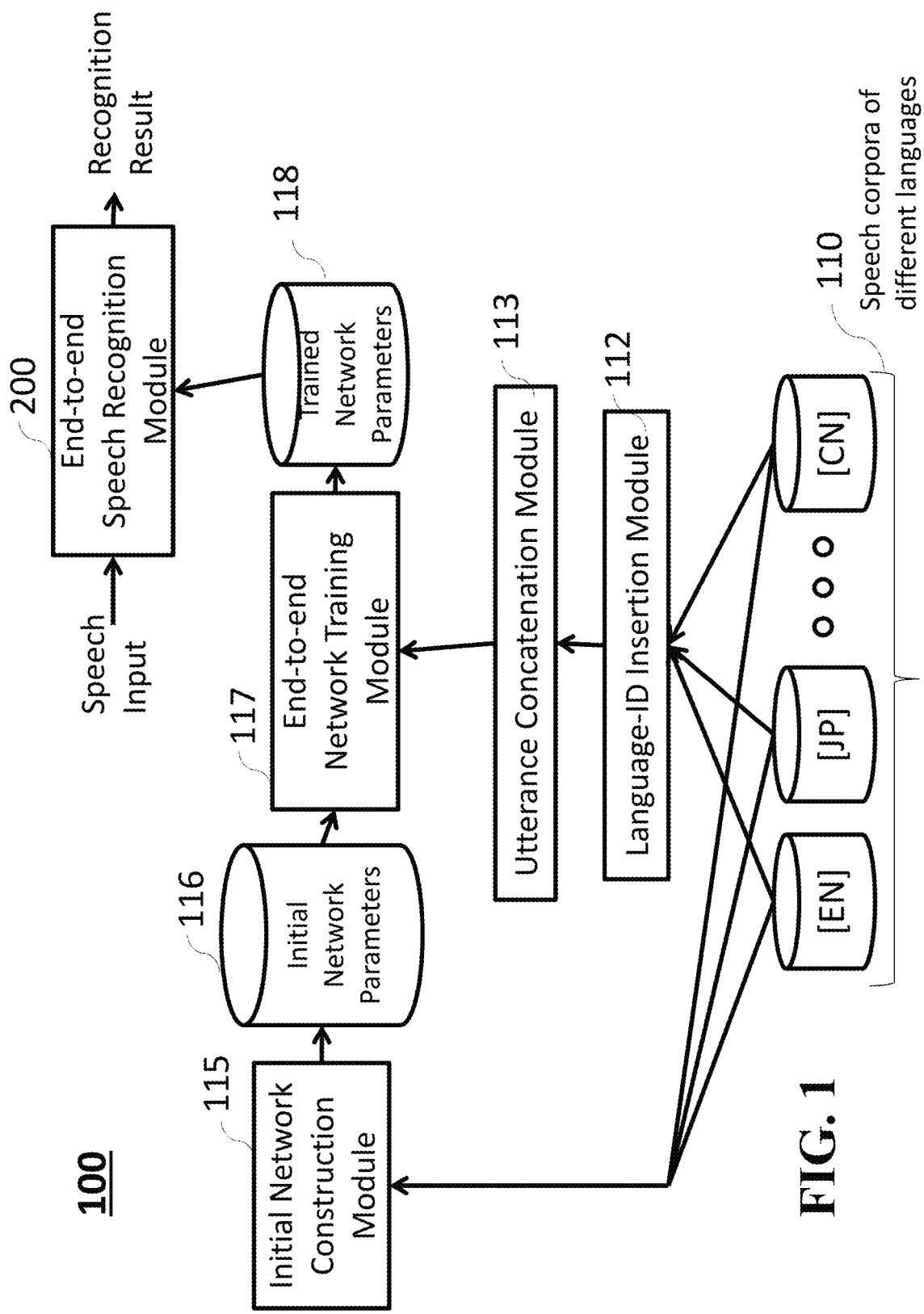
FIG. 1 is a block diagram illustrating a method for a multi-lingual speech recognition, according to the embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

In the preferred embodiments of the present invention, a language-independent neural network is constructed using multiple speech corpora of different languages.

The neural network can be used to recognize a spoken utterance and identify the language of the utterance jointly. For example, this neural network can be used to automatically transcribe utterances in English, Japanese, Mandarin, German, Spanish, French, Italian, Dutch, Portuguese, and Russian, and jointly identify the language of each utterance. If a person speaks "How are you?" in English to a system built according to the embodiments of the present invention, the system may output "[EN] how are you?" in a text format. If another person speaks "comment allez-vous ?" in French to the same system, it may output "[FR] comment allez-vous?" in a text format. [EN] and [FR] represent language ID labels corresponding to English and French, respectively. If a person speaks "How are you? comment allez-vous?" in English and French to the system, it may output "[EN] how are you? [FR] comment allez-vous?" in a text format.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Modules and networks exemplified in the present disclosure may be computer programs, software or instruction codes, which can execute instructions using one or more processors. Modules and networks may be stored in one or more storage devices or otherwise stored into computer readable media such as storage media, computer storage media, or data storage devices (removable and/or non-removable) such as, for example, magnetic disks, optical disks, or tape, in which the computer readable media are accessible from the one or more processors to execute the instructions.

Computer storage media may include volatile and non-volatile, removable and non-removable media implemented in any method or technology for storage of information, such as computer readable instructions, data structures, program modules, or other data. Computer storage media may be RAM, ROM, EEPROM or flash memory, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both using one or more processors. Any such computer storage media may be part of the device or accessible or connectable thereto. Any application or module herein described may be implemented using computer readable/executable instructions that may be stored or otherwise held by such computer readable media.

Figure 4:
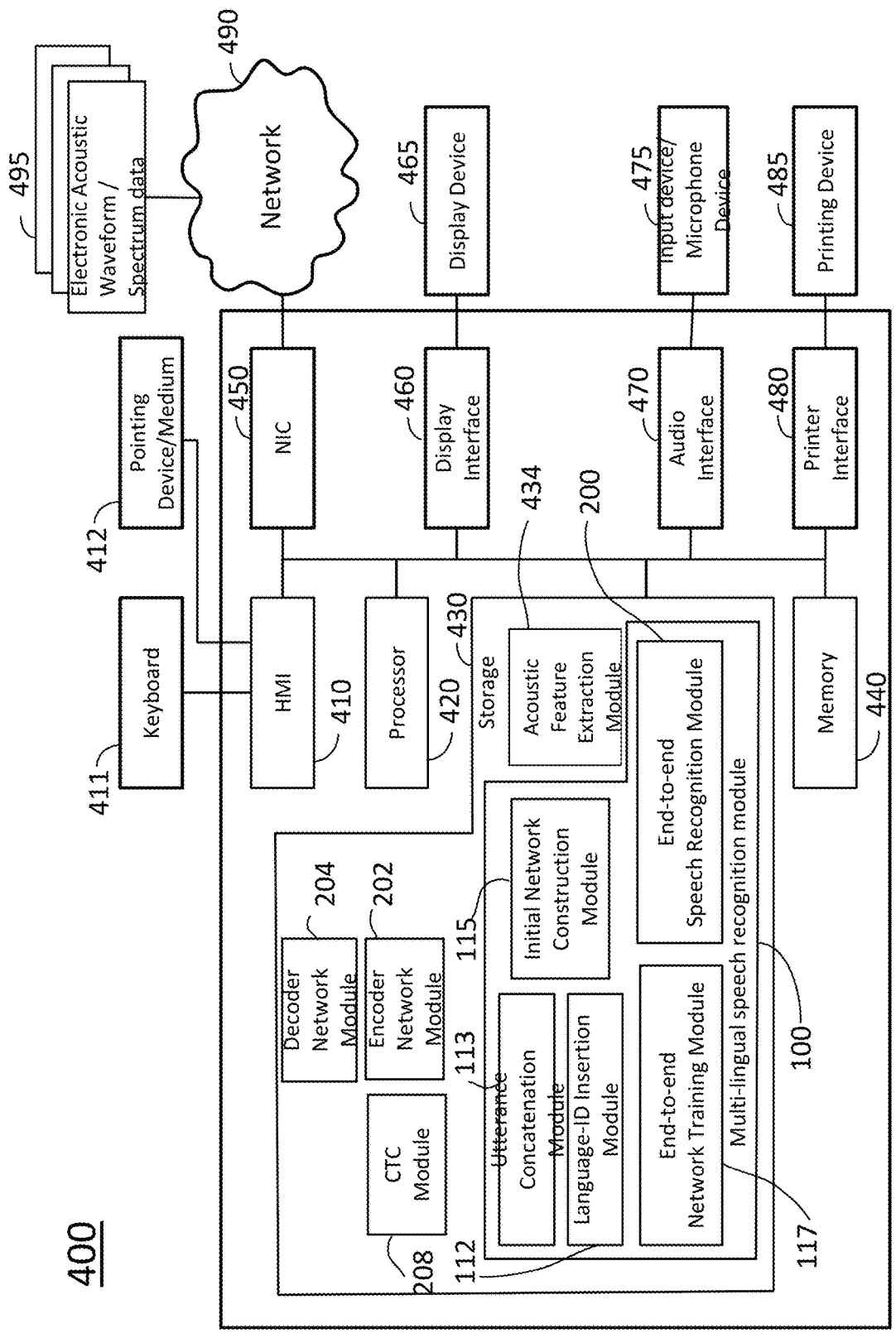
FIG. 4 is a block diagram illustrating a multi-lingual speech recognition system, according to embodiments of the present invention.

FIG. 1 shows a multi-lingual speech recognition module 100 stored in a storage 430 in FIG. 4. The multi-lingual speech recognition module 100 is a processor (hardware processor) executable program that includes program modules (computer-executable instruction modules) such as a language-ID Insertion module 112, an utterance Concatenation module 113, an initial Network Construction module 115, an end-to-end network training module 117, and an end-to-end speech recognition module 200. The program modules 112, 113, 115, 117 and 100 included in the multi-lingual speech recognition module 100 are also indicted in FIG. 4. Further, the storage 430 includes an encoder network module 202, an attention decoder network module 204, a CTC module 208 and an end-to-end speech recognition module 200, which will be discussed later.

The multi-lingual speech recognition module 100 constructs a language independent network according to the following steps:
(1) Initial Network Construction module 115 makes (generates) initial network parameters 116 using a universal label set obtained as a union of grapheme sets and language IDs using speech corpora of different languages 110.
(2) Language-ID Insertion module 112 inserts a language ID label into the transcript of each utterance in the speech corpora of different languages 110.
(3) Utterance Concatenation module 113 generates utterances by selecting one or more utterances from the speech corpora of different languages 110 and concatenating them in a random order, where the corresponding transcripts are also concatenated in the same order as the concatenated utterances.
(4) End-to-end network training module 117 optimizes the initial network parameters 116 using the generated utterances and the transcripts, and outputs the trained network parameters 118.

In some cases, the speech corpora of different languages 110 may be referred to acoustic dataset 110. Further, the modules and network parameters indicated in the present disclosure may be stored in a storage or multiple storages according to a system design, and the modules are computer (hardware processor) executable programs by a processor 430 indicated in FIG. 4. The processor 430 may be one or more (hardware) processors (computers). Each of the modules performs a predetermined process or processes by being executed using the processor or processors.

Using the language independent network stored in the trained network parameters 118, an end-to-end speech recognition module 200 can jointly recognize speech and language ID for speech input, and outputs a recognition result.

Figure 2:
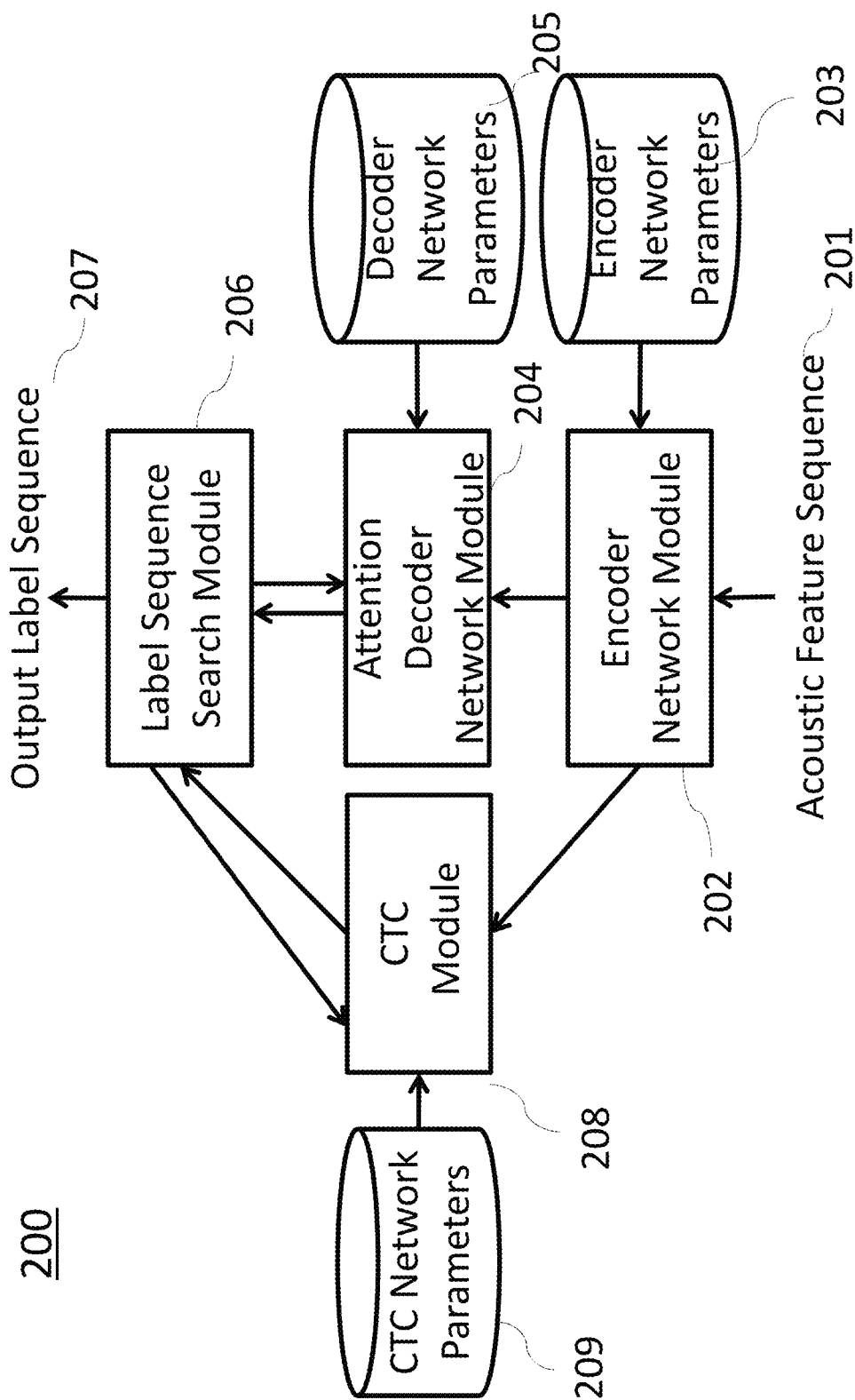
FIG. 2 is a block diagram illustrating a speech recognition module using a multi-lingual end-to-end network, according to embodiments of the present invention.

FIG. 2 is a block diagram illustrating an end-to-end speech recognition module 200 according to embodiments of the present invention.

The end-to-end speech recognition module 200 includes an encoder network module 202, encoder network parameters 203, an attention decoder module 204, decoder network parameters 205, a label sequence search module 206, a CTC module 208, and CTC network parameters 209. The encoder network parameters 203, the decoder network parameters 205 and the CTC network parameters 209 are respectively stored in a storage device to provide parameters to corresponding modules 202, 204 and 208. An acoustic feature sequence 201 is extracted from audio waveform data or spectrum data using an acoustic feature extraction module 434 in FIG. 4. The audio waveform data or spectrum data may be stored in a storage device and provided to the encoder network module 202. The audio waveform data or spectrum data may be obtained via an input device 475 in FIG. 4 using a digital signal processing module (not shown) receiving and converting voice sounds into the audio waveform or spectrum data. Further, the audio waveform or spectrum data stored in a storage device 430 or memory 440 may be provided to the encoder network module 202. The signal of the voice sounds may be provided via a network 490 in FIG. 4, and the input device 475 may be a microphone device.

The encoder network module 202 includes an encoder network that converts acoustic feature sequence 201 into a hidden vector sequence using the encoder network reading parameters from encoder network parameters 203.

An attention mechanism using an attention decoder network 204 is described as follows. The attention decoder network module 204 includes a decoder network. The attention decoder network module 204 receives the hidden vector sequence from the encoder network module 202 and a previous label from the label sequence search module 206, and then computes first posterior probability distributions of the next label for the previous label using the decoder network reading parameters from decoder network parameters 205. The attention decoder network module 204 provides the first posterior probability distribution to the label sequence search module 206. The CTC module 208 receives the hidden vector sequence from the encoder network module 202 and the previous label from the label sequence search module 206, and computes second posterior probability distributions of the next label sequence using the CTC network parameters 209 and a dynamic programming technique. After the computation, the CTC module 208 provides the second posterior probability distributions to the label sequence search module 206.

The label sequence search module 206 finds the label sequence with the highest sequence probability using the first and second posterior probability distributions provided from the attention decoder network module 204 and the CTC module 208. The first and second posterior probabilities of label sequence computed by the attention decoder network module 204 and the CTC module 208 are combined into one probability. In this case, the combination of the computed posterior probabilities may be performed based on the linear combination. With the end-to-end speech recognition module 200, it becomes possible to take the CTC probabilities into account to find a better aligned hypothesis to the input acoustic feature sequence.

Neural Network Architecture for Language-Independent End-to-End Speech Recognition End-to-end speech recognition is generally defined as a problem to find the most probable label sequence $\hat{Y}$ given input acoustic feature sequence X, i.e.

$$\hat{Y} = \arg\max_{Y \in \mathcal{U}^*} p(Y \mid X), \tag{1}$$

where $\mathcal{U}^*$ denotes a set of possible label sequences given a set of pre-defined labels $\mathcal{U}$. A label may be a character or a word. The label sequence probability p (Y|X) can be computed using a pre-trained neural network.

In the embodiments of the present invention, the language-independent neural network may be a combination of different networks such as feed-forward neural networks (FFNNs), convolutional neural networks (CNNs) and recurrent neural networks (RNNs).

For example, hybrid attention/CTC architecture may be used for the language-independent neural network. FIG. 2 is a block diagram illustrating the speech recognition module 200 using a multi-lingual end-to-end network with the hybrid attention/CTC architecture, wherein the label sequence probabilities are computed as follows.

An encoder module 202 includes an encoder network used to convert acoustic feature sequence $X=x_1, \ldots, x_T$ into hidden vector sequence $H=h_1, \ldots, h_T$ as $$H = \text{Encoder}(X), \tag{2}$$

where function Encoder(X) may consist of one or more recurrent neural networks (RNNs), which are stacked. An RNN may be implemented as a Long Short-Term Memory (LSTM), which has an input gate, a forget gate, an output gate and a memory cell in each hidden unit. Another RNN may be a bidirectional RNN (BRNNs) or a bidirectional LSTM (BLSTM). A BLSTM is a pair of LSTM RNNs, one is a forward LSTM and the other is a backward LSTM. A Hidden vector of the BLSTM is obtained as a concatenation of hidden vectors of the forward and backward LSTMs.

With the forward LSTM, the forward t-th hidden vector $h_t^F$ is computed as $$h_t^F = o_t^F \odot \tanh(c_t^F) \tag{3}$$

$$o_t^F = \sigma(W_{xo}^F x_t + W_{xc}^F h_{t-1}^F + b_o^F) \tag{4}$$

$$c_t^F = f_t^F \odot c_{t-1}^F + i_t^F \odot \tanh(W_{xc}^F x_t + W_{hc}^F h_{t-1}^F + b_c^F) \tag{5}$$

$$f_t^F = \sigma(W_{xf}^F x_t + W_{hg}^F h_{t-1}^F + b_f^F) \tag{6}$$

$$i_t^F = \sigma(W_{xi}^F x_t + W_{hi}^F h_{t-1}^F + b_i^F) \tag{7}$$

where $\sigma(\cdot)$ is the element-wise sigmoid function, $\tanh(\cdot)$ is the element-wise hyperbolic tangent function, and $i_t^F$, $f_t^F$, $o_t^F$ and $c_t^F$ are the input gate, forget gate, output gate, and cell activation vectors for $x_t$, respectively. $\odot$ denotes the element-wise multiplication between vectors. The weight matrices $W_{zz}^F$ and the bias vector $b_z^F$ are the parameters of the LSTM, which are identified by the subscript $z \in \{x, h, i, f, o, c\}$. For example, $W_{hi}^F$ is the hidden-to-input gate matrix and $W_{xo}^F$ is the input-to-output gate matrix. The hidden vector $h_t^F$ is obtained recursively from the input vector $x_t$ and the previous hidden vector $h_{t-1}^F$, where $h_0^F$ is assumed to be a zero vector.

With the backward LSTM, the backward t-th hidden vector $h_t^B$ is computed as $$H_t^B = o_t^B \odot \tanh(c_t^B) \tag{8}$$

$$o_t^B = \sigma(W_{xo}^B x_t + W_{xc}^B h_{t+1}^B + b_o^B) \tag{9}$$

$$c_t^B = f_t^B \odot c_{t+1}^B + i_t^B \odot \tanh(W_{xc}^B x_t + W_{hc}^B h_{t+1}^B + b_c^B) \tag{10}$$

$$f_t^B = \sigma(W_{xf}^B x_t + W_{hg}^B h_{t+1}^B + b_f^B) \tag{11}$$

$$i_t^B = \sigma(W_{xi}^B x_t + W_{hi}^B h_{t+1}^B + b_i^B) \tag{12}$$

where $i_t^B$, $f_t^B$, $o_t^B$ and $c_t^B$ are the input gate, forget gate, output gate, and cell activation vectors for $x_t$, respectively. The weight matrices $W_{zz}^B$ and the bias vector $b_z^B$ are the parameters of the LSTM, which are identified by the subscript in the same manner as the forward LSTM. The hidden vector $h_t^B$ is obtained recursively from the input vector $x_t$ and the succeeding hidden vector $h_{t+1}^B$, where $h_{T+1}^B$ is assumed to be a zero vector.

The hidden vector of the BLSTM is obtained by concatenating the forward and backward hidden vectors as $$h_t = [h_t^{F\tau}, h_t^{B\tau}]^\tau \tag{13}$$

where $\tau$ denotes the transpose operation for the vectors assuming all the vectors are column vectors. $W_{zz}^F$, $b_z^F$, $W_{zz}^B$, and $b_z^B$ are considered the parameters of the BLSTM.

To obtain better hidden vectors, we may stack multiple BLSTMs by feeding the hidden vectors of the first BLSTM to the second BLSTM, then feeding the hidden vectors of the second BLSTM to the third BLSTM, and so on. If $h_t'$ is a hidden vector obtained by one BLSTM, we assume $x_t = h_t'$ when feeding it to another BLSTM. To reduce the computation, it may feed only every second hidden vectors of one BLSTM to another BLSTM. In this case, the length of output hidden vector sequence becomes the half of the length of input acoustic feature sequence.

All the parameters $W_{zz}^F$, $b_z^F$, $W_{zz}^B$, and $b_z^B$ identified by the subscript $z \in \{x, h, i, f, o, c\}$ of the multiple BLSTMs are stored in the encoder network parameters 203, and used to compute hidden vector sequence H.

An attention decoder module 104 includes a decoder network used to compute label sequence probability $p_{att}$ (Y|X) using hidden vector sequence H. Suppose Y is an L-length label sequence $y_1, y_2, \ldots, y_L$. To compute $p_{att}$(Y|X) efficiently, the probability can be factorized by a probabilistic chain rule as $$p_{att}(Y \mid X) = \prod_{l=1}^{L} p_{att}(y_l \mid y_1, \ldots, y_{l-1}, X), \tag{14}$$

and each label probability $p_{att}(y_l|y_1, \ldots, y_{l-1}, X)$ is obtained from a probability distribution over labels, which is estimated using the decoder network as $$p_{att}(y|y_1, \ldots, y_{l-1}, X) = \text{Decoder}(r_l, q_{l-1}), \tag{15}$$

where y is a random variable representing a label, $r_l$ is called a content vector, which has content information of H. $q_{l-1}$ is a decoder state vector, which contains contextual information of the previous labels $y_1, \ldots, y_{l-1}$ and the previous content vectors $r_0, \ldots, r_{l-1}$. Accordingly, the label probability is obtained as the probability of $y=y_l$ given the context, i.e.

$$p_{att}(y_l|y_1, \ldots, y_{l-1}, X) = p_{att}(y=y_l|y_1, \ldots, y_{l-1}, X) \tag{16}$$

The content vector $r_l$ is usually given as a weighted sum of hidden vectors of the encoder network, i.e.

$$r_l = \sum_t a_{lt} h_t, \tag{17}$$

where $\alpha_{lt}$ is called an attention weight that satisfies $\Sigma_t \alpha_{lt}=1$. The attention weights can be computed using $q_{l-1}$ and H as $$e_{lt} = w^T \tanh(W q_{l-1} + V h_t + U f_{lt} + b) \tag{18}$$

$$f_l = F * a_{l-1} \tag{19}$$

$$a_{lt} = \frac{\exp(e_{lt})}{\sum_{\tau=1}^{T} \exp(e_{l\tau})} \tag{20}$$

where W, V, F and U are matrices, and w and b are vectors, which are trainable parameters of the decoder network. $e_{lt}$ is a matching score between the (l−1)-th state vector $q_{l-1}$ and the t-th hidden vector $h_t$ to form a temporal alignment distribution $a_l=\{\alpha_{lt}|t=1,\ldots,T\}$. $a_{l-1}$ represents the previous alignment distribution $\{\alpha_{(l-1)t}|t=1,\ldots,T\}$ used for predicting the previous label $y_{l-1}$. $f_l=\{f_{lt}|t=1,\ldots,T\}$ is the convolution result with F for $a_{l-1}$, which is used to reflect the previous alignment to the current alignment. "*" denotes a convolution operation.

The label probability distribution is obtained with state vector $q_{l-1}$ and content vector $r_l$ as $$\text{Decoder}(r_l, q_{l-1}) = \text{softmax}(W_{qy} q_{l-1} + W_{ry} r_l + b_y), \tag{21}$$

where $W_{qy}$ and $W_{ry}$ are matrices and $b_y$ is a vector, which are trainable parameters of the decoder network. The softmax( ) function is computed as $$\text{softmax}(v) = \frac{\exp(v[i])}{\sum_{j=1}^{K} \exp(v[j])} \bigg|_{i=1,\ldots,K} \tag{22}$$

for a K-dimensional vector v, where v[i] indicates the i-th element of v.

After that, decoder state vector $q_{l-1}$ is updated to $q_l$ using an LSTM as $$q_l = o_l^D \odot \tanh(c_l^D) \tag{23}$$

$$o_l^D = \sigma(W_{xo}^D x_l^D + W_{xc}^D q_{l-1} + b_o^D) \tag{24}$$

$$c_l^D = f_l^D \odot c_{l-1}^D + i_l^D \odot \tanh(W_{xc}^D x_l^D + W_{hc}^D q_{l-1} + b_c^D) \tag{25}$$

$$f_l^D = \sigma(W_{xf}^D x_l^D + W_{hg}^D q_{l-1} + b_f^D) \tag{26}$$

$$i_l^D = \sigma(W_{xi}^D x_l^D + W_{hi}^D q_{l-1} + b_i^D), \tag{27}$$

where $i_l^D$, $f_l^D$, $o_l^D$ and $c_l^D$ are the input gate, forget gate, output gate, and cell activation vectors for input vector $x_l$, respectively. The weight matrices $W_{zz}^D$ and the bias vector $b_z^D$ are the parameters of the LSTM, which are identified by the subscript in the same manner as the forward LSTM. The state vector $q_l$ is obtained recursively from the input vector $x_l^D$ and the previous state vector $q_{l-1}$, where $q_0$ is computed assuming $q_{-1}=0$, $y_0=\text{<sos>}$, and $a_0=1/T$. For the decoder network, the input vector $x_l^D$ is given as a concatenated vector of label $y_l$ and content vector $r_l$, which can be obtained as $x_l^D=[\text{Embed}(y_l)^\tau, r_l^\tau]^\tau$, where Embed(•) denotes label embedding, that converts a label into a fixed dimensional vector. For example, it can be computed by $$\text{Embed}(y) = W_e^D \text{OneHot}(y), \tag{28}$$

where OneHot(y) denotes a 1-of-N coding of label y which converts a label index to a one hot vector representation. $W_e^D$ is a matrix, which is a trainable parameter.

All the parameters $W_{zz}^D$ and $W_z^D$ identified by the subscript $z \in \{x, h, i, f, o, c\}$ and $W_{qy}$, $W_{ry}$, $b_y$, $W_e^D$ are stored in the decoder network parameters 205, and used to compute the label probability distribution $p_{att}(y=y_l|y_1,\ldots,y_{l-1},X)$.

The CTC module 208 computes a CTC forward probability of label sequence Y given hidden vector sequence H. Note that the CTC formulation uses L-length label sequence $Y=\{y_l \in \mathcal{U} | l=1,\ldots,L\}$ with a set of distinct labels $\mathcal{U}$. By introducing framewise label sequence with an additional "blank" label, $Z=\{z_t \in \mathcal{U} \cup \{b\} | t=1,\ldots,T\}$, where b represents a blank label. By using the probabilistic chain rule and conditional independence assumption, the posterior distribution p(Y|X) is factorized as follows:

$$p(Y|X) \approx \sum_Z p(Y|Z) p(Z|X) \approx \tag{29}$$

$$\sum_Z p(Y|Z) \prod_t p(z_t|X) \approx \sum_Z \prod_t p(z_t|z_{t-1}, Y) p(z_t|X),$$

where $p(z_t|z_{t-1}|Y)$ is considered a label transition probability including blank labels. $p(z_t|X)$ is the framewise posterior distribution conditioned on the input sequence X, and modeled by using bidirectional long short-term memory (BLSTM):

$$p(z_t|X) = \text{softmax}(W_{hy}^{CTC} h_t + b_y^{CTC}), \tag{30}$$

where $h_t$ is obtained with an encoder network. $W_{hy}^{CTC}$ is a matrix and $b_y^{CTC}$ is a vector, which are trainable parameters of CTC and stored in CTC network parameters 209. Although Eq. (29) has to deal with a summation over all possible Z, it is efficiently computed by using a forward algorithm.

The forward algorithm for CTC is performed as follows. We use an extended label sequence $Y'=y'_1, y'_2, \ldots, y'_{2L+1}=b, y_1, b, y_2, \ldots, b, y_L, b$ of length 2L+1, where a blank label "b" is inserted between each pair of adjacent labels. Let $\alpha_t(s)$ be a forward probability, which represents the posterior probability of label sequence $y_1, \ldots, y_l$ for time frames $1, \ldots, t$, where s indicates the position in the extended label sequence Y'.

For initialization, we set $$\alpha_1(1) = p(z_1 = b|X) \tag{31}$$

$$\alpha_1(2) = p(z_1 = y_1|X) \tag{32}$$

$$\alpha_1(s) = 0, \forall s > 2. \tag{33}$$

For t=2 to T, $\alpha_t(s)$ is computed recursively as $$\alpha_t(s) = \begin{cases} \bar{\alpha}_t(s) p(z_t = y'_s | X) & \text{if } y'_s = b \text{ or} \\ & y'_{s-2} = y'_s \\ (\bar{\alpha}_t(s) + \alpha_{t-1}(s-2)) p(z_t = y'_s | X) & \text{otherwise} \end{cases} \tag{34}$$

where $$\bar{\alpha}_t(s) = \alpha_{t-1}(s) + \alpha_{t-1}(s-1). \tag{35}$$

Finally, the CTC-based label sequence probability is obtained as $$P_{ctc}(Y|X) = \alpha_T(2L+1) + \alpha_T(2L). \tag{36}$$

The framewise label sequence Z represents an alignment between input acoustic feature sequence X and output label sequence Y. When computing the forward probability, the recursion of Eq. (34) enforces Z to be monotonic and does not allow looping or big jumps of s in alignment Z, because the recursion to obtain $\alpha_t(s)$ only considers at most $\alpha_{t-1}(s)$, $\alpha_{t-1}(s-1)$, $\alpha_{t-1}(s-2)$. This means that when time frame proceeds one frame, the label changes from the previous label or blank, or keeps the same label. This constraint plays a role of the transition probability $p(z_t|z_{t-1},Y)$ that enforces alignments to be monotonic. Hence, $p_{ctc}(Y|X)$ can be 0 or a very small value when it is computed based on irregular (non-monotonic) alignments.

Finally, we obtain the label sequence probability by combining the CTC-based probability in Eq. (36) and attention-based probability in Eq. (14) in log domain as $$\log p(Y|X) = \lambda \log p_{ctc}(Y|X) + (1-\lambda) \log p_{att}(Y|X), \quad (37)$$

where $\lambda$ is a scalar weight such that $0 \leq \lambda \leq 1$ and may be determined manually.

Figure 3:
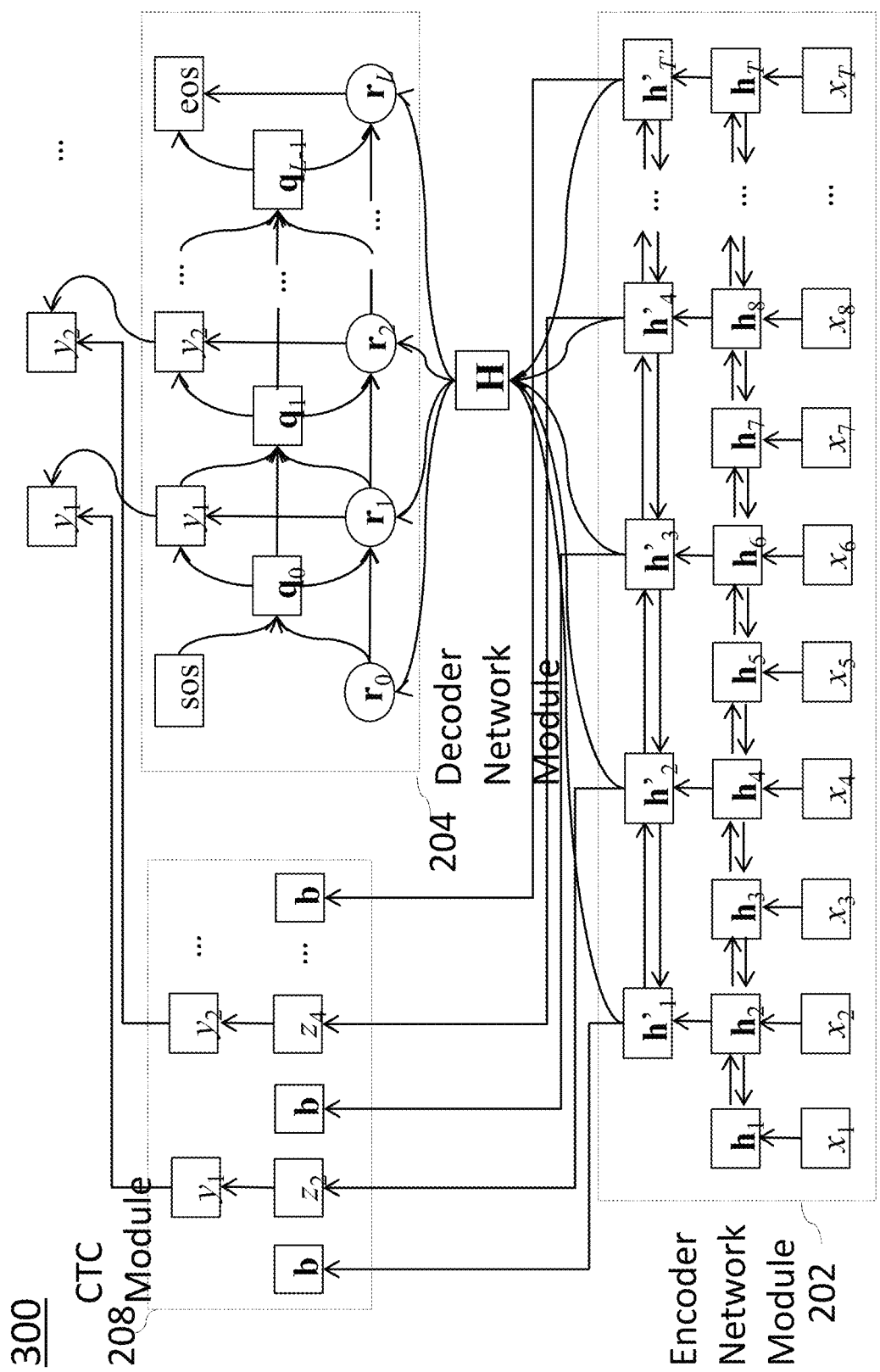
FIG. 3 is a schematic diagram illustrating neural networks in a multi-lingual speech recognition module, according to embodiments of the present invention.

FIG. 3 is a schematic diagram illustrating a combined neural network module 300 according to embodiments of the present invention. The combined neural network 300 includes an encoder network module 202, an attention decoder network module 204 and a CTC module 208. Each arrow represents a data transfer with or without transformation, and each square or circle node represents a vector or a predicted label. Acoustic feature sequence $X=x_1, \ldots, x_T$ is fed to the encoder network module 202, where two BLSTMs are stacked and every second hidden vectors of the first BLSTM are fed to the second BLSTM. The output of the encoder module 202 results in hidden vector sequence $H=h'_1, h'_2, \ldots, h'_{T'}$, where $T'=T/2$. Then, H is fed to the CTC module 208 and the decoder network module 204. The CTC-based and attention-based sequence probabilities are computed with the CTC module 208 and the attention decoder network module 204, respectively, and combined to obtain the label sequence probability.

Joint Language Identification and Speech Recognition

A key idea of the language-independent end-to-end system is to consider as the set of output labels an augmented character set including the union of character sets appearing in all the target languages, i.e., $\mathcal{U}^{union} = \mathcal{U}^{EN} \cup \mathcal{U}^{JP} \cup \ldots$, where $\mathcal{U}^{EN/JP/\ldots}$ is a character set of a specific language. By using this augmented character set, likelihoods of character sequences can be computed for any language, without requiring a separate language identification module. The network is trained to automatically predict the correct character sequence for the target language of each utterance. The use of the union, as opposed to using a unique character set for each language, eliminates the duplication of output symbols that occur in multiple languages, and yields a more compact model representation with reduced computational cost. The language-independent system repeats the prediction of language ID and speech recognition given consecutive multilingual speech.

Furthermore, we make the prediction of the language ID an explicit part of the system by further augmenting the set of output labels to include the language ID, i.e., $\mathcal{U}^{final} = \mathcal{U}^{union} \cup \{[EN], [JP], \ldots\}$ is used as a set of labels $\mathcal{U}$ for end-to-end speech recognition. According to embodiments of the present invention, the network first predicts a language ID, $k \in \{[EN], [JP], \ldots\}$. Instead of a posterior distribution $p(Y|X)$ where $Y=y_1, \ldots, y_L$ is a sequence of characters in $\mathcal{U}$ and X is a sequence of acoustic feature vectors, the system models the joint distribution $p(k, Y|X)$ of the language ID and character sequence as that of an augmented sequence $Y'=(k, Y)$ where $y'_1=k$ and $y'_l=y_{l+1}$, $\forall l>1$. This is formulated by using the probabilistic chain rule as follows:

$$p(Y'|X) = p(k) \prod_{l=1}^{L} p(y_l|k, y_1, \ldots, y_{l-1}, X). \quad (38)$$

Furthermore, for the case including multiple languages in an utterance, it allows the network to output multiple language IDs throughout. For a sequence $Y'=y'_1, \ldots, y'_L$, of characters in $\mathcal{U}^{final}$, we denote by $l_1, \ldots, l_N$ the indices of the characters $k_n = y'_{l_n}$ in $Y'$ that are language IDs (i.e., $k_n \in \{[EN], [JP], \ldots\}$). The system now models the joint distribution of language ID and characters as $$p(Y'|X) = \prod_n p(k_n|y'_1, \ldots, y'_{l_n-1}, X) \prod_{l=l_n+1}^{l_{n+1}-1} p(y'_l|k_n, y'_1, \ldots, y'_{l-1}, X). \quad (39)$$

This is the same as modeling the distribution of language-mixed character sequence including language IDs such as "[EN] h o w <space> a r e <space> y o u ? [FR] c o m m e n t <space> a l l e z-v o u s ?", where <space> formally represents a space character.

Figure 5:
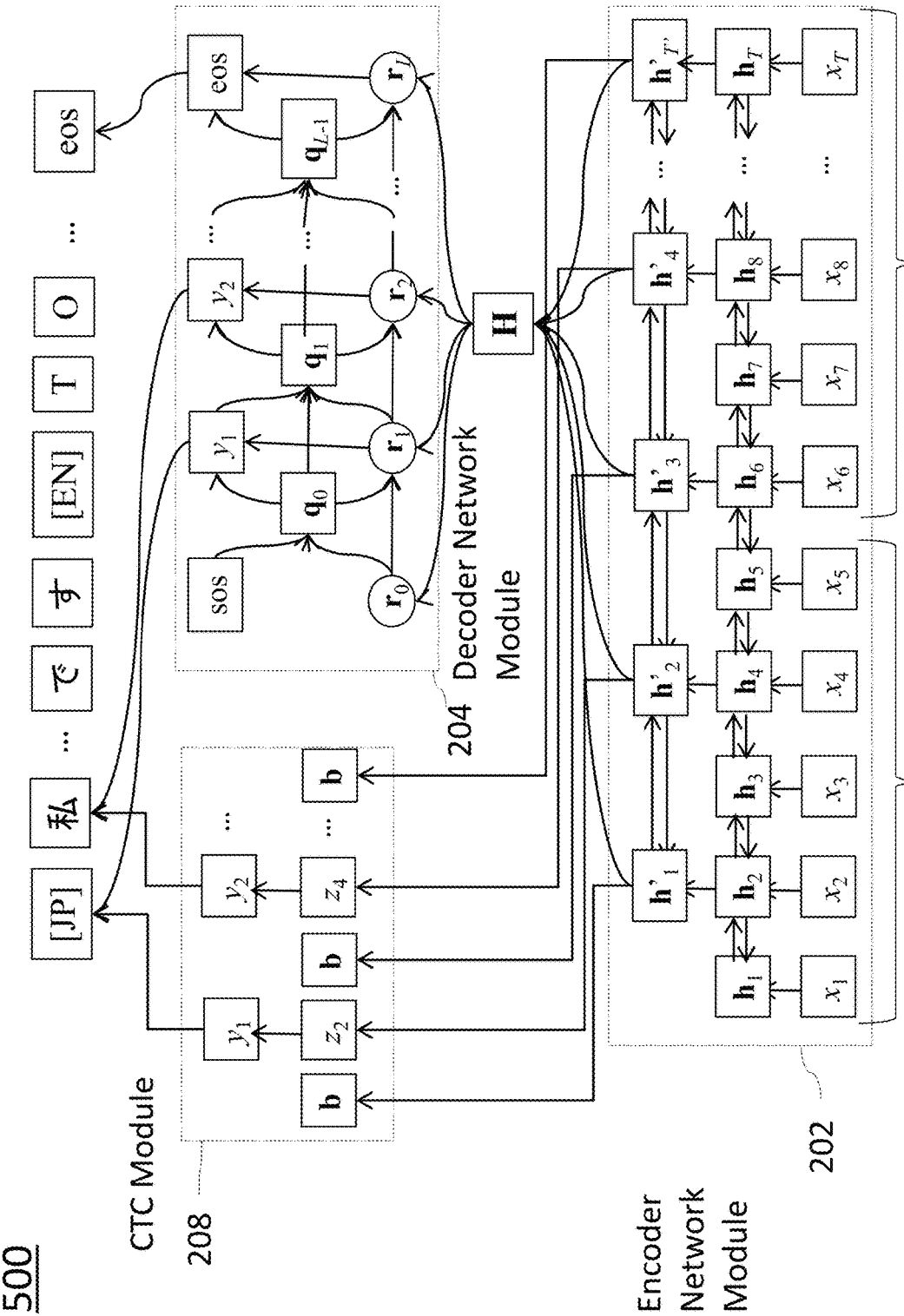
FIG. 5 is a schematic diagram illustrating neural networks in a multi-lingual speech recognition module, according to embodiments of the present invention.

The hybrid attention/CTC architecture may be used to model such language-mixed character sequence. When recognizing a language-mixed utterance, the network can switch the language of the output sequence. FIG. 5 shows an example of character sequence prediction using the hybrid attention/CTC network. The encoder network computes hidden vector sequence H by taking as input acoustic features consisting of Japanese and English speech. Although we assume $x_1, \ldots, x_5$ corresponds to Japanese and $x_6, \ldots, x_T$ corresponds to English in the example, in there is no indicator that separates the languages in the actual acoustic feature sequence. According to embodiments of the invention, the attention decoder network can predict language ID "[JP]" followed by a Japanese character sequence, and after decoding the first Japanese character sequence, the network can further predict the language ID that matches the character sequence that follows, here "[EN]".

Data Generation for Multi-Lingual Speech Recognition

To predict language-mixed utterances, the hybrid attention/CTC network needs to be trained using a set of such language-mixed corpus. However, it is very difficult to collect a sufficient amount of such speech corpus, in which multiple languages appear within the same utterance. In actual, collecting and transcribing such utterances is very costly and time consuming. In embodiments of the present invention, such corpus is artificially generated from a set of language-dependent corpora, which already exist.

Suppose each utterance in the multiple corpora has its corresponding transcript as a sequence of characters. Hereafter, a method to generate such language-mixed corpus is explained according to embodiments of the present invention in FIG. 1. First Language-ID insertion module 112 inserts a language ID to the transcript of each utterance in the language-dependent corpora. The language ID may be located in the head of each character sequence. Next, Utterance Concatenation Module 113 selects utterances from language-dependent corpora while paying attention to the coverage of selected utterances and the variation of language transitions as described further below. The selected utterances (and their transcripts) are then concatenated and considered as a single utterance in the generated corpus. This procedure is repeated until the duration of the generated corpus reaches that of the union of the original corpora.

FIG. 6 shows the details of the generation procedure. We first define probabilities to sample languages and utterances. The probability of sampling a language is proportional to the duration of its original corpus, with a constant term 1/N added to alleviate the selection bias caused by data size. We set a maximum number $N_{concat}$ of utterances to concatenate, 3 in our experiments. For each number $n_{concat}$ between 1 and $N_{concat}$, we create a concatenated utterance consisting of $n_{concat}$ utterances from the original corpora, by sampling $n_{concat}$ languages and utterances based on their sampling probabilities. In order to maximize the coverage of the original corpora, we prevent utterances from being reused too much by introducing maximum usage count, $n_{reuse}$, set to 5 for the training set, and 2 for the development and evaluation sets. We use this procedure to generate a training set, a development set, and an evaluation set.

Training Procedure

In the end-to-end network training module 117, Encoder Network Parameters 203, Decoder Network Parameters 205, and CTC Network Parameters 209 are jointly optimized so that the loss function $$\mathcal{L}(X, Y, \Theta) = \sum_{n=1}^{N} -\lambda \log p_{ctc}(Y_n \mid X_n, \Theta) - (1-\lambda) \log p_{att}(Y_n \mid X_n, \Theta), \quad (40)$$

is reduced, where X and Y are training data including acoustic feature sequences and label sequences. According to embodiments of the present invention, the training data (X, Y) are generated from existing language-dependent corpora using Language-ID insertion module 112 and Utterance concatenation module 113 in FIG. 1.

Θ denotes a set of network parameters including Encoder Network Parameters 203, Decoder Network Parameters 205, and CTC Network Parameters 209. $\mathcal{N}$ is the number of training samples. $X_n$ is the n-th acoustic feature sequence in X and $Y_n$ is the n-th label sequence in Y. $p_{ctc}(Y_n|X_n, \Theta)$ is the CTC-based sequence probability in Eq. (53) computed with parameter set Θ and $p_{att}(Y_n|X_n, \Theta)$ is the attention-based sequence probability in Eq. (14) computed with parameter set Θ.

The set of network parameters Θ may be optimized by a stochastic gradient descent method. First, Initial Network Construction module 115 obtains initial network parameters 116, wherein the sizes of matrices and vectors and the initial value of each element of the matrices and vectors are determined. The sizes of matrices and vectors may be decided manually or automatically. For instance, for the matrices and vectors depending on the size of label set $\mathcal{U}^{final}$, the sizes are determined according to the label set size $|\mathcal{U}^{final}|$. For example, the number of rows of matrices $W_{qy}$ and $W_{ry}$ should equal $|\mathcal{U}^{final}|$, and the number of dimensions of vector $b_y$ should also equal $|\mathcal{U}^{final}|$ in Eq. (21), because the number should equal the dimension of label probability distribution $p_{att}(y|y_1, \ldots, y_{l-1}, X)$. Each element of the matrices and vectors may be set as a random real number. $\mathcal{U}^{final}$ is determined by obtaining unique characters and language IDs in the original speech corpora of different languages 110.

Next, End-to-end Network Training module 117 jointly optimizes the encoder, decoder, and CTC network parameters in parameter set Θ. Based on a gradient descent method, each element of the parameter set Θ is repeatedly updated as $$\Theta \leftarrow \Theta - \eta \frac{\partial}{\partial \Theta} \mathcal{L}(X, Y, \Theta), \quad (41)$$

until $\mathcal{L}(X, Y, \Theta)$ converges, where η is a learning rate.

It is also possible to split X and Y into M small subsets $\{\mathbb{X}_m, \mathbb{Y}_m\}_{m=1,\ldots,M}$ such that $X = \mathbb{X}_1 \cup \ldots \cup \mathbb{X}_M$ and $Y = \mathbb{Y}_1 \cup \ldots \cup \mathbb{Y}_M$, and update the parameters by repeating $$\Theta \leftarrow \Theta - \eta \frac{\partial}{\partial \Theta} \mathcal{L}(\mathbb{X}_m, \mathbb{Y}_m, \Theta), \quad (42)$$

for m=1, ..., M. By updating the parameters with the small subsets, the parameters are updated more frequently and the loss function converges more quickly.

In our experiments, we consider two training procedures. In the flat start procedure, the model is trained only using the generated corpus, from scratch. In the retrain procedure, the model is trained in two steps, using both the original and generated corpora as follows. We first train the model using the training data without language switching (i.e., the original corpora), then continue the training using the data with language switching (generated corpus). We consider these two steps for the following reasons. First, the model trained by the data without language switching is a good starting point for the training of the arguably more difficult data with language switching. Secondly, we allowed the data generation algorithm to select duplicated utterances in order to increase the ratio of low-resource languages. However, this property causes a decrease in coverage. The two-step training alleviates this problem.

Label Sequence Search

Label sequence search module 206 finds the most probable label sequence P according to the combined label sequence probabilities as $$\hat{Y} = \arg\max_{Y \in \mathcal{U}^*} \{\lambda \log p_{ctc}(Y \mid X) + (1-\lambda) \log p_{att}(Y \mid X)\}, \quad (43)$$

where $p_{ctc}(Y|X)$ is the CTC-based label sequence probability in Eq. (36), $p_{att}(Y|X)$ is the attention-based label sequence probability in Eq. (14), and $\mathcal{U} = \mathcal{U}^{final}$ according to embodiments of the present invention.

However, it is difficult to enumerate all possible label sequences for Y and compute $\lambda \log p_{ctc}(Y|X)+(1-\lambda)\log p_{att}(Y|X)$, because the number of possible label sequences increases exponentially to the length of the sequence. Therefore, a beam search technique is usually used to find $\hat{Y}$, in which shorter label sequence hypotheses are generated first, and only a limited number of hypotheses, which have a higher score than others, are extended to obtain longer hypotheses. Finally, the best label sequence hypothesis is selected in the complete hypotheses that reached the end of the sequence.

Let $\Omega_l$ be a set of partial hypotheses of the length l. At the beginning of the beam search, $\Omega_0$ contains only one hypothesis with the starting symbol <sos>. For l=1 to $L_{max}$, each partial hypothesis in $\Omega_{l-1}$ is expanded by appending possible single labels, and the new hypotheses are stored in $\Omega_l$, where $L_{max}$ is the maximum length of the hypotheses to be searched.

The score of each partial hypothesis h is computed as $$\psi_{joint}(h)=\lambda\psi_{ctc}(h, X)+(1-\lambda)\psi_{att}(h), \qquad (44)$$

where $\psi_{att}(h)$ is computed as $$\psi_{att}(h)=\psi_{att}(g)+\log p_{att}(y|g). \qquad (45)$$

To compute $\psi_{ctc}(h, X)$, we utilize the CTC prefix probability defined as the cumulative probability of all label sequences that have h as their prefix:

$$p_{ctc}(h, \ldots | X) \triangleq \sum_{v \in (\mathcal{U} \cup \{<eos>\})^+} p_{ctc}(h \cdot v | X), \qquad (46)$$

and we define the CTC score as $$\psi_{ctc}(h, X) \triangleq \log p_{ctc}(h, \ldots | X), \qquad (47)$$

where v represents all possible label sequences except the empty string. The CTC score cannot be obtained recursively as $\psi_{att}(h)$ in Eq. (45) but it can be computed efficiently by keeping the forward probabilities over the input time frames for each partial hypothesis.

According to the embodiments of the present invention, label sequence search module 206 finds $\hat{Y}$ according to the following procedure.

```
Input: X, L_max
Output: Ŷ
 1:      Ω_0 ← {<sos>}
 2:      Ω̂ ← ∅
 3:      ψ_att(<sos>) ← 0
 4:      for l = 1 ... L_max do
 5:          Ω_l ← ∅
 6:          while Ω_{l-1} ≠ ∅ do
 7:              g ← Head(Ω_{l-1})
 8:              Dequeue(Ω_{l-1})
 9:              for each y ∈ 𝒰 ∪ {<eos>} do
10:                  h ← g · y
11:                  ψ_att(h) ← ψ_att(g) + log p_att(y|g, X)
12:                  ψ_joint(h) ← λψ_ctc (h, X) + (1 − λ)ψ_att(h)
13:                  if y = <eos> then
14:                      Enqueue(Ω̂, h)
15:                  else
16:                      Enqueue(Ω_l, h)
17:                      if |Ω_l| > beamWidth then
18:                          h_min ← arg min_{h∈Ω_l} ψ_joint(h)
19:                          Remove(Ω_l, h_min)
20:                      end if
21:                  end if
22:              end for
23:          end while
24:      end for
25:      Ŷ ← arg max_{h∈ Ω̂} ψ_joint(h)
```

In this procedure, $\Omega_l$ and $\hat{\Omega}$ are implemented as queues that accept partial hypotheses of the length l and complete hypotheses, respectively. In lines 1-2, $\Omega_0$ and $\hat{\Omega}$ are initialized as empty queues. In line 3, the score for the initial hypothesis <sos> is set to 0. In lines 4-24, each partial hypothesis g in $\Omega_{l-1}$ is extended by each label y in label set $\mathcal{U} \cup \{<eos>\}$, where operations Head($\Omega$) returns the first hypothesis in queue $\Omega$, and Dequeue($\Omega$) removes the first hypothesis from the queue.

Each extended hypothesis h is scored using the attention decoder network in line 11 and combined with CTC score in line 12. After that, if y=<eos>, the hypothesis h is assumed to be complete and stored in $\hat{\Omega}$ in line 14, where Enqueue($\hat{\Omega}$, h) is an operation that adds h to $\hat{\Omega}$. If y≠<eos>, h is stored in $\Omega_l$ in line 16, where the number of hypotheses in $\Omega_l$, i.e. $|\Omega_l|$, is compared with a pre-determined number beamWidth in line 17. If $|\Omega_l|$ exceeds beamWidth, the hypothesis with the minimum score $h_{min}$ in $\Omega_l$ is removed from $\Omega_l$ in lines 18-19, where Remove($\Omega_l$, $h_{min}$) is an operation that removes $h_{min}$ from $\Omega_l$. Finally, $\hat{Y}$ is selected as the best hypothesis in line 25.

CTC score $\psi_{ctc}(h, X)$ can be computed using a modified forward algorithm. Let $\gamma_t^{(n)}(h)$ and $\gamma_t^{(b)}(h)$ be the forward probabilities of the hypothesis h over the time frames 1 ... t, where the superscripts (n) and (b) denote different cases in which all CTC paths end with a nonblank or blank label, respectively. Before starting the beam search, $\gamma_t^{(n)}(\bullet)$ and $\gamma_t^{(b)}(\bullet)$ are initialized for t=1, ..., T as $$\gamma_t^{(n)}(<sos>) = 0, \qquad (48)$$

$$\gamma_t^{(b)}(<sos>) = \prod_{\tau=1}^{t} \gamma_{\tau-1}^{(b)}(<sos>) p(z_\tau = b | X), \qquad (49)$$

where we assume that $\gamma_0^{(b)}(<sos>)=1$ and b is a blank label. Note that the time index t and input length T may differ from those of the input utterance X owing to the subsampling technique for the encoder. The CTC score function can be implemented as follows.

```
Input: h, X
Output: ψ_ctc (h, X)
 1: g, y ← h        ◁ split h into the last label y and the rest g
 2: if y = <eos> then
 3:     return log{γ_T^(n) (g) + γ_T^(b) (g)}
 4: else
 5:     γ_1^(n)(h) ← { p(z_1 = y | X)  if g = <sos>
                      { 0              otherwise
 6:     γ_1^(b) (h) ← 0
 7:     Ψ ← γ_1^(n) (h)
 8:     for t = 2 ... T do
 9:         Φ ← γ_{t-1}^(b)(g) + { 0                  if last(g) = y
                                  { γ_{t-1}^(n)(g)   otherwise
10:         γ_t^(n) (h) ← (γ_{t-1}^(n) (h) + Φ) p(z_t = y|X)
11:         γ_t^(b) (h) ← (γ_{t-1}^(b) (h) + γ_{t-1}^(n) (h)) p(z_t = b|X)
12:         Ψ ← Ψ + Φ · p(z_t = y|X)
13:     end for
14:     return log(Ψ)
15: end if
```

In this function, the given hypothesis h is first split into the last label y and the rest g in line 1. If y is <eos>, it returns the logarithm of the forward probability assuming that h is a complete hypothesis in line 3. The forward probability of h is given by $$p_{ctc}(h|X)=\gamma_T^{(n)}(g)+\gamma_T^{(b)}(g) \qquad (50)$$

according to the definition of $\gamma_t^{(n)}(\bullet)$ and $\gamma_t^{(b)}(\bullet)$. If y is not <eos>, it computes the forward probabilities $\gamma_t^{(n)}(h)$ and $\gamma_t^{(b)}(h)$, and the prefix probability $\psi=p_{ctc}(h, \ldots |X)$ assuming that h is not a complete hypothesis. The initialization and recursion steps for those probabilities are described in lines 5-13. In this function, it is assumed that whenever computing $\gamma_t^{(n)}(h)$, $\gamma_t^{(b)}(h)$ and $\psi$ in lines 10-12, the probabilities $\gamma_{t-1}^{(n)}(g)$ and $\gamma_{t-1}^{(b)}(g)$ in line 9 have already been obtained through the beam search process because g is a prefix of h such that |g|<|h|. Accordingly, the prefix and forward probabilities can be computed efficiently. Note that last(g) in line 9 is a function that returns the last label of g.

Multi-Lingual End-to-End Speech Recognition Apparatus

FIG. 4 shows a block diagram of a multi-lingual end-to-end speech recognition system 400 according to some embodiments of the invention. The end-to-end speech recognition system 400 includes a human machine interface (HMI) 410 connectable with a keyboard 411 and a pointing device/medium 412, one or more processor 420, a storage device 430, a memory 440, a network interface controller 450 (NIC) connectable with a network 490 including local area networks and internet network, a display interface 460, an audio interface 470 connectable with a microphone device 475, a printer interface 480 connectable with a printing device 485. The memory 440 may be one or more memory units. The end-to-end speech recognition system 400 can receive electric audio waveform/spectrum data 495 via the network 490 connected to the NIC 450. The storage device 430 includes an end-to-end speech recognition module 200, the Language-ID Insertion module 112, the utterance Concatenation module 113, the initial Network Construction module 115, the end-to-end network training module 117, an encoder network module 202, an attention decoder network module 204, a CTC module 208 and the end-to-end speech recognition module 200, and an acoustic feature extraction module 434. In some cases, the modules 112, 113, 115, 117, 202, 204 and 208 may be independently arranged in the storage 430, the memory 440 or an outside attachable memory (not shown), depending on a system design.

For other program modules, such as a label sequence search module, encoder network parameters, decoder network parameters and CTC network parameters, are omitted in the figure. Further, the pointing device/medium 412 may include modules that are computer-executable (processor-executable) programs stored on a computer readable recording medium. The attention decoder network module 204, the encoder network module 202, and the CTC module 208 may be formed by neural network parameters. The acoustic feature extraction module 434 is a program module used to extract an acoustic feature sequence from. The acoustic feature sequence may be a sequence of Mel-scale filterbank coefficients with their first and second order temporal derivatives and/or pitch features.

For performing the end-to-end speech recognition, instructions may be transmitted to the end-to-end speech recognition system 400 using the keyboard 411, the pointing device/medium 412 or via the network 490 connected to other computers (not shown in the figure). The system 400 receives instructions via the HMI 410 and executes the instructions for performing end-to-end speech recognition using the processor 420 in connection with the memory 440 by loading the end-to-end speech recognition module 200, the attention decoder network module 204, the encoder network module 202, the CTC module 208, and the acoustic feature extraction module 434 stored in the storage device 430.

Experiments

The original corpora are based on WSJ, CSJ (Maekawa et al. 2000), HKUST (Liu et al. 2006), and Voxforge (German, Spanish, French, Italian, Dutch, Portuguese, Russian) ("Voxforge," n.d.).

We built language-dependent and language-independent end-to-end systems with the hybrid attention/CTC network architecture. The language-dependent model uses a 4-layer BLSTM encoder network, while the language-independent model has a deep BLSTM encoder network such as a deep 7-layer BLSTM encoder network. The number of layers in the BLSTM encoder network is not limit to 7 layers. In some cases, according to the system design, the number of layers may be 2 or more than 2. We used 80-dimensional Mel filterbank features concatenated with 3-dimensional pitch features. For the language-independent models, the final softmax layers in both CTC and attention-based branches had 5,520 dimensions (i.e., $|\mathcal{U}^{final}|$=5,520).

For English, in order to handle the relatively long sentences in the WSJ corpus, we expand the alphabet character set to 201 by adding tokens corresponding to up to 5-grain character sequences frequently appearing in the WSJ text corpus. This makes the output length L shorter, in order to reduce computational cost and GPU memory usage.

For each language, we trained a language-dependent ASR model, where the dimension of the final softmax layers was set to the number of distinct characters/tokens for that language. This paper strictly followed an end-to-end ASR concept, and did not use any pronunciation lexicon, word-based language model, GMM/HMM, or DNN/HMM. Our hybrid attention/CTC architecture was implemented with Chainer (Tokui et al. 2015).

Results

FIG. 7 shows the character error rates (CERs) of the trained language-dependent and language-independent end-to-end ASR systems on a multi-lingual evaluation set including language switching. CERs are averaged over the 10 languages and separately shown depending on the number of languages in each utterance.

In the case of including only one language in each utterance, (i.e., no language switching), the language independent models significantly outperformed the language dependent models. When the number of languages was two or three, the language independent model trained with language switching data reduced CERs from 31.5% to 21.3% for the 2-language case and from 38.6% to 20.8% for the 3-language case. By retraining the flat start language-independent model, we obtained further CER reductions, i.e. the CERs resulted in 19.4%, 19.3%, and 18.6% for all the cases, respectively.

Accordingly, the language-independent ASR successfully reduced CERs and the model trained with language switching data is able to properly switch between languages during the decoding process.

We also computed the language ID error rate by extracting language IDs from the recognition results obtained using the language-independent model retrained with the language switching data. In the case of including only one language in each utterance, the language ID error rate was 2.0%. In the case of including one-to-three languages in each utterance, the ID error rate was 8.5%. Thus, the present invention can recognize multi-lingual speech and the language IDs jointly with a small number of errors.

FIG. 8 shows transcription examples generated by our models. The utterance consists of Japanese, English, and Dutch. The model without language switching cannot predict neither the correct language IDs nor the use of the Japanese character set. We can observe that the model with language switching recognized multilingual speech with low CER.

In some embodiments of the present disclosure, when the end-to-end speech recognition system described above is installed in a computer system, speech recognition can be effectively and accurately performed with less computing power, thus the use of the end-to-end speech recognition method or system of the present disclosure can reduce central processing unit usage and power consumption.

Further, embodiments according to the present disclosure provide and effective method for performing end-to-end speech recognitions, thus, the use of a method and system using the end-to-end speech recognition model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A method for training a multi-language speech recognition network, comprising:
    providing utterance datasets corresponding to predetermined languages;
    inserting language identification (ID) labels into the utterance datasets, wherein each of the utterance datasets is labelled by each of the language ID labels;
    concatenating the labeled utterance datasets;
    generating initial network parameters from the utterance datasets; and
    training, iteratively, an end-to-end network with a series of the initial network parameters and the concatenated labeled utterance datasets until a training result reaches a threshold
    wherein the end-to-end speech network recognition module includes instructions which, when executed, cause the one or more processors to perform operations comprising:
    extracting, using an acoustic feature extraction module, an acoustic feature sequence from audio waveform data converted from the voice sounds;
    encoding the acoustic feature sequence into a hidden vector sequence using an encoder network having encoder network parameters;
    predicting first output label sequence probabilities by feeding the hidden vector sequence to a decoder network having decoder network parameters;
    predicting second output label sequence probabilities by a connectionist temporal classification (CTC) module using CTC network parameters and the hidden vector sequence from the encoder network; and
    searching, using a label sequence search module, for an output label sequence having a highest sequence probability by combining the first and second output label sequence probabilities provided from the decoder network and the CTC module.

2. The method of claim 1, wherein each of the utterance datasets includes a pair of an acoustic dataset and ground truth labels corresponding to the acoustic dataset.

3. The method of claim 1, wherein the end-to-end network is a language independent model.

4. The method of claim 3, wherein the language independent model uses a deep BLSTM encoder network.

5. The method of claim 4, wherein a number of layers in the deep BLSTM encoder network is 7 or more than 7.

6. The method of claim 1, wherein the ID labels are arranged to the utterance datasets according to an arrangement rule.

7. The method of claim 6, wherein the arrangement rule causes each of the ID labels to be added to a head position of each of the utterance datasets.

8. The method of claim 1, further comprises
    generating trained network parameters when the training result has reached the threshold.

9. The method of claim 1, wherein the end-to-end network jointly optimizes the series of the initial network parameters and the concatenated labeled utterance datasets based on a predetermined method.

10. The system of claim 1, further comprises
    generating trained network parameters when the training result has reached the threshold.

11. A speech recognition system for performing multi-language speech recognition, comprising:
    an interface to receive voice sounds;
    one or more processors; and
    one or more storage devices storing an end-to-end speech recognition network module having been trained by using trained network parameters obtained by a method that comprises:
    providing utterance datasets corresponding to predetermined languages;
    inserting language identification (ID) labels into the utterance datasets, wherein each of the utterance datasets is labelled by each of the language ID labels;
    concatenating the labeled utterance datasets;
    generating initial network parameters from the utterance datasets; and training, iteratively, an end-to-end network with a series of the initial network parameters and the concatenated labeled utterance datasets until a training result reaches a threshold, wherein the end-to-end speech network recognition module includes instructions which, when executed, cause the one or more processors to perform operations comprising:

extracting, using an acoustic feature extraction module, an acoustic feature sequence from audio waveform data converted from the voice sounds;

encoding the acoustic feature sequence into a hidden vector sequence using an encoder network having encoder network parameters;

predicting first output label sequence probabilities by feeding the hidden vector sequence to a decoder network having decoder network parameters;

predicting second output label sequence probabilities by a connectionist temporal classification (CTC) module using CTC network parameters and the hidden vector sequence from the encoder network; and searching, using a label sequence search module, for an output label sequence having a highest sequence probability by combining the first and second output label sequence probabilities provided from the decoder network and the CTC module.

12. A multi-lingual speech recognition system for generating trained network parameters for a multi-language speech recognition, comprising:

one or more processors; and one or more storage devices storing parameters and program modules including instructions executable by the one or more processors which, when executed, cause the one or more processors to perform operations comprising:

providing utterance datasets corresponding to predetermined languages;

inserting language identification (ID) labels into the utterance datasets, wherein each of the utterance datasets is labelled by each of the language ID labels;

concatenating the labeled utterance datasets;

generating initial network parameters from the utterance datasets;

selecting the initial network parameters according to a predetermined sequence; and training, iteratively, an end-to-end network with a series of the selected initial network parameters and the concatenated labeled utterance datasets until a training result reaches a threshold, wherein the end-to-end network performs:

extracting, using an acoustic feature extraction module, an acoustic feature sequence from audio waveform data converted from the voice sounds;

encoding the acoustic feature sequence into a hidden vector sequence using an encoder network having encoder network parameters;

predicting first output label sequence probabilities by feeding the hidden vector sequence to a decoder network having decoder network parameters;

predicting second output label sequence probabilities by a connectionist temporal classification (CTC) module using CTC network parameters and the hidden vector sequence from the encoder network; and searching, using a label sequence search module, for an output label sequence having a highest sequence probability by combining the first and second output label sequence probabilities provided from the decoder network and the CTC module.

13. The system of claim 12, wherein each of the utterance datasets includes a pair of an acoustic dataset and ground truth labels corresponding to the acoustic dataset.

14. The system of claim 12, wherein the end-to-end network is a language independent model.

15. The system of claim 14, wherein the language independent model uses a deep BLSTM encoder network.

16. The system of claim 15, wherein a number of layers in the deep BLSTM encoder network is 7 or more than 7.

17. The system of claim 12, wherein the ID labels are arranged to the utterance datasets according to an arrangement rule.

18. The system of claim 17, wherein the arrangement rule causes each of the ID labels to be added to a head position of each of the utterance datasets.

* * * * *